US008917101B2

(12) United States Patent
Huang et al.

(10) Patent No.: US 8,917,101 B2
(45) Date of Patent: Dec. 23, 2014

(54) TOUCH DETECTION METHOD AND RELATED TOUCH CONTROL DEVICE

(75) Inventors: He-Wei Huang, Hsinchu (TW); Chun-Hung Chen, Taipei (TW); Chih-Yuan Chang, Changhua County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 802 days.

(21) Appl. No.: 13/046,783

(22) Filed: Mar. 14, 2011

(65) Prior Publication Data

US 2011/0273193 A1 Nov. 10, 2011

(30) Foreign Application Priority Data

May 5, 2010 (TW) .............................. 99114346 A

(51) Int. Cl.
*G01R 27/26* (2006.01)
*G06F 3/041* (2006.01)
*G06F 3/044* (2006.01)

(52) U.S. Cl.
CPC .............. *G06F 3/044* (2013.01); *G06F 3/0416* (2013.01)
USPC ........... 324/678; 324/672; 320/166; 345/173; 345/174; 178/18.06

(58) Field of Classification Search
CPC ... G06F 3/044; G06F 3/0416; G01R 27/2605; H03K 17/955; G01D 5/24
USPC ........................................ 324/672
See application file for complete search history.

(56) References Cited

U.S. PATENT DOCUMENTS

| 5,329,239 A | 7/1994 | Kindermann |
| 5,444,378 A * | 8/1995 | Rogers .......................... 324/428 |
| 7,504,833 B1 * | 3/2009 | Seguine ........................ 324/672 |
| 7,705,567 B2 * | 4/2010 | Okamura et al. ............. 320/166 |

(Continued)

FOREIGN PATENT DOCUMENTS

| CN | 101477152 A | 7/2009 |
| TW | 200951459 | 12/2009 |
| TW | 201017495 | 5/2010 |

OTHER PUBLICATIONS

Huang et al., Title: Capacitance Measurement Device for a Touch Control Device, pending U.S. Appl. No. 13/046,780, filed Mar. 14, 2011.

(Continued)

*Primary Examiner* — Benjamin M Baldridge
(74) *Attorney, Agent, or Firm* — Winston Hsu; Scott Margo

(57) ABSTRACT

A touch detection method for a touch control device including a touch panel includes examining whether a charging capacity for charging a measured capacitor of the touch panel and a discharging capacity for discharging the measured capacitor are determined; charging and discharging the measured capacitor by using the charging capacity and the discharging capacity when the charging capacity and the discharging capacity are determined and receiving a count value representing the capacitance of the measured capacitor, examining whether a base count value is set, calculating a difference between the count value and the base count value when the base count value is set, for determining whether the touch panel is touched, examining whether the count value is in a predetermined range, and performing a charging and discharging capacity setting process when the count value is out of the predetermined range, for adjusting the charging capacity and the discharging capacity.

38 Claims, 16 Drawing Sheets

(56) References Cited

U.S. PATENT DOCUMENTS

| | | |
|---|---|---|
| 8,018,238 B2 * | 9/2011 | Cormier, Jr. .................. 324/678 |
| 8,072,230 B1 * | 12/2011 | Seguine ........................ 324/672 |
| 8,363,033 B2 * | 1/2013 | Chen et al. ................... 345/174 |
| 8,497,690 B2 | 7/2013 | Bartling |
| 2007/0279010 A1 * | 12/2007 | Okamura et al. ............. 320/166 |
| 2008/0061800 A1 | 3/2008 | Reynolds |
| 2008/0179112 A1 * | 7/2008 | Qin et al. .................. 178/18.06 |
| 2008/0297175 A1 | 12/2008 | Wu |
| 2009/0174416 A1 | 7/2009 | Ely |
| 2010/0079406 A1 | 4/2010 | Chen |
| 2010/0097077 A1 | 4/2010 | Philipp |
| 2010/0102832 A1 | 4/2010 | Bartling |
| 2010/0231241 A1 | 9/2010 | Mueck |
| 2010/0259283 A1 | 10/2010 | Togura |
| 2011/0115717 A1 * | 5/2011 | Hable et al. ................... 345/173 |
| 2011/0133757 A1 | 6/2011 | Chae |
| 2011/0163766 A1 * | 7/2011 | Geaghan ....................... 324/678 |
| 2011/0187389 A1 | 8/2011 | Han |
| 2012/0001551 A1 * | 1/2012 | Abe et al. ...................... 315/127 |
| 2012/0043970 A1 * | 2/2012 | Olson .......................... 324/601 |

OTHER PUBLICATIONS

He-Wei Huang et al., Capacitance Measurement Device and Electronic Device Thereof, pend U.S. Appl. No. 14/474,296, filed Sep. 1, 2014.

* cited by examiner

TOUCH DETECTION METHOD AND RELATED TOUCH CONTROL DEVICE

BACKGROUND OF THE INVENTION

1. Field of the Invention

The present invention relates to a touch detection method and related touch control device, and more particularly, to a method for precisely detecting a touch happening on a touch panel and related touch control device.

2. Description of the Prior Art

A touchscreen is an LCD screen combined with a touch panel, widely applied in a variety of consumer electronics as a user interface. A projected capacitive touch technology permits higher sensibility, durability and multi-touch operation and is popularly used in touch panels. Please refer to FIG. 1, which is a schematic diagram of a touch control device 10 according to the prior art. The touch control device 10 comprises a touch panel 100, a multiplexer 102, a capacitance measurement device 104, a processing unit 106, and a memory 108. The touch panel 100 is a projected capacitive touch panel consisting of intersecting Indium Tin Oxide (ITO) traces that act as row and column electrodes. Each trace is equivalent to an RC circuit composed of a resistor and a capacitor. When a user touches or approaches the touch panel 100, a human body capacitor may be coupled to the touched trace and thus the capacitance of the trace changes. In other words, the touched trace is regarded as a measured capacitor for the capacitance measurement device 104. The multiplexer 102 is coupled to all traces of the touch panel 100 and is utilized for conducting a connection between each trace and the capacitance measurement device 104. In other words, the capacitance measurement device 104 scans the touch panel 100 through the multiplexer 102 for detecting if a touch happens. The capacitance measurement device 104 converts the capacitance of the measured capacitor into a recordable value as an analog voltage or a digital count value, outputted to the processing unit 106.

When the touch panel 100 is not touched, the capacitor of each trace is regarded as an environment capacitor. The capacitance of the environment capacitor is also measured and converted into a base count value by the capacitance measurement device 104, and is stored in the memory 108. Touch panels of different characteristics may have different capacitance of the environment capacitor. Whether the measured capacitance of the environment capacitor is accurate influences touch detection. When the touch panel 100 is touched, a human body capacitor is coupled to the measured capacitor and the capacitance of the measured capacitor changes. The processing unit 106 compares a new count value generated by the capacitance measurement device 104 with the base count value and thereby determines if the touch panel 100 is touched.

There are several ways for the capacitance measurement device 104 to measure the capacitance of the measured capacitor. A simple way is to connect the measured capacitor and a resistor or a current source and use the principle of RC time constant to measure a charging/discharging period, for estimating the capacitance of the measured capacitor. Note that, the capacitor of each trace when the touch panel 100 is not touched is of a very small capacitance around tens to hundreds picofarad (pF). For this reason, when the measured capacitor is an environment capacitor, the charging/discharging period is short, which may result in a large measurement error. Another way to measure the capacitance of the measured capacitor is called charge transfer, which is to transfer electric charges from the measured capacitor to an integrating capacitor of a larger capacitance by one or more than one times until the voltage on the integrating capacitor reaches a predetermined voltage and then discharge the integrating capacitor, to estimate the capacitance of the measured capacitor. Since the method of charge transfer measures the capacitance of the measured capacitance only according to the charging period of the integrating capacitor, measurement is not efficient enough.

Another conventional method, called delta-sigma method, combines the principle of RC time constant and the method of charge transfer. Please refer to FIG. 2, which is a schematic diagram of a capacitance measurement device 20 based on the delta-sigma method according to the prior art. The capacitance measurement device 20 can be used as the capacitance measurement device 104 of the touch control device 10 of FIG. 1. The capacitance measurement device 20 comprises an integrating capacitor 200, a discharging circuit 202, a comparator 204, a digital signal processing unit 206, and switches SW1 and SW2. Please refer to FIG. 3, which is a timing diagram of signals with respect to the capacitance measurement device 20 performing a charging and discharging procedure. FIG. 3 illustrates waveforms of a signal S1 controlling the switch SW1, a signal S2 controlling the switch SW2, the voltage signal $V_{CM}$ on the integrating capacitor 200, and a signal SB outputted from the comparator 204, respectively depicted by a dashed line for the case of a larger capacitance of the measured capacitor 22 and a solid line for the case of a smaller capacitance of the measured capacitor 22.

The signals S1 and S2 respectively control the switches SW1 and SW2 to be turned on at different time. When the switch SW1 is turned off and the switch SW2 is turned on, the voltage source $V_{CC}$ charges the measured capacitor 22; when the switch SW1 is turned on and the switch SW2 is turned off, electric charge stored on the measured capacitor 22 is transferred to the integrating capacitor 200. When charge transfer is ongoing, the comparator 204 compares the voltage level of the voltage signal $V_{CM}$ with a reference voltage $V_{REF}$ and outputs a signal SB as a comparison result. At the same time, the digital signal processing unit 206 converts the signal SB into a count value Dx. When the voltage level of the voltage signal $V_{CM}$ is large than the reference voltage $V_{REF}$, the signal SB controls the discharging circuit 202 to discharge the integrating capacitor 200. When the measured capacitor 22 is of a large capacitance, electric charge transferred to the integrating capacitor 200 is also a large amount and therefore the duty cycle of the signal SB is high.

Briefly, the capacitance measurement device 20 uses the duty cycle of the signal SB to represent the capacitance of the measured capacitor 22, and converts the signal SB into the digital count value Dx outputted to a rear-stage circuit, so that capacitance variance of the measured capacitor 22 can be determined. Compared to the capacitance measurement by charging/discharging periods or charge transfer previously mentioned, when the measured capacitor is the environment capacitor which is of a small value, the capacitance measurement device 20 obtains a more precise capacitance and has a higher efficiency. However, the capacitance measurement device 20 still has some disadvantages as follows.

The capacitance measurement device 20 uses the measured capacitor 22 of an unknown capacitance to charge the integrating capacitor 200 of a fixed capacitance. In order to estimate touch panels of different characteristics, the capacitance of the integrating capacitor 200 has to be tens of nanofarad (nF), which is far larger than the capacitance of the measured capacitor 22 and costs a lot, whatever the integrating capacitor 200 is integrated into an application specified integrated circuit (ASIC) of the capacitance measurement device 20 or is an external component for the capacitance measurement device 20. Moreover, the integrating capacitor 200 is easily interfered with the electromagnetic signals when it is an external component, which may result in instability of the voltage signal $V_{CM}$ on the integrating capacitor 200 and generate noise in the signal SB that influences capacitance measurement accuracy.

In practice, when the discharging period of the integrating capacitor 200 is finished, the voltage level of the voltage signal $V_{CM}$ has to return to an initial voltage level for a next charging period, which intends that the discharging capacity has to be greater than the charging capacity. When the capacitance of the measured capacitor 22 is a large value, electric charge transferred from the measured capacitor 22 to the integrating capacitor 200 is also a large amount. In this situation, if the discharging period for the discharging circuit 202 to discharge the integrating capacitor 200 is not long enough, the voltage signal $V_{CM}$ on the integrating capacitor 200 may have no way to return to the initial voltage level. As a result, the voltage level of the voltage signal $V_{CM}$ accumulates during every charging period. Please refer to FIG. 4, which is a timing diagram of signals with respect to the capacitance measurement device 20 performing a charging and discharging procedure. As shown in FIG. 4, when the discharging period for the discharging circuit 202 is not long enough, the voltage level of the voltage signal $V_{CM}$ accumulates to be the highest voltage level as that of the full-charged measured capacitor 22. In this situation, electric charge stored on the measured capacitor 22 is not transferred to the integrating capacitor 200 and the capacitance measurement device 20 does not work normally. The above problems of the voltage level accumulating may also occur when the charging capacity is greater than the discharging capacity due to environment variance.

When the capacitance of the measured capacitor 22 is far less than the capacitance of the integrating capacitor 200, the voltage level of the voltage signal $V_{CM}$ varies slightly after charge transfer, which intends that the discharging capacity is comparatively larger than the charging capacity. In this situation, it takes more time to charge the integrating capacitor 200 to make the voltage signal $V_{CM}$ reach a voltage level high enough for capacitance measurement. On the other hand, when a short discharging period is used, the capacitance variance of the measured capacitor 22 cannot be measured precisely.

Since the charging or discharging capacity cannot be adjusted in the conventional capacitance measurement devices, the conventional capacitance measurement devices cannot achieve the same measurement accuracy when measuring touch panels of different characteristics. Besides, the conventional capacitance measurement devices and methods cannot renew the environment capacitance. As a result, when a touch panel used for a long time is touched, or a touch panel in an environment with various factors is touched, the rear-stage circuit connected to the conventional capacitance measurement device cannot precisely detect touches since it uses an inaccurate environment capacitance for comparison.

SUMMARY OF THE INVENTION

It is therefore a primary objective of the claimed invention to provide a touch detection method and related touch control device.

The present invention discloses a touch detection method for a touch control device including a touch panel. The touch detection method comprises examining whether a charging capacity for charging a measured capacitor of the touch panel and a discharging capacity for discharging the measured capacitor are determined; charging and discharging the measured capacitor by using the charging capacity and the discharging capacity when the charging capacity and the discharging capacity are determined and receiving a count value representing the capacitance of the measured capacitor; examining whether a base count value is set, the base count value corresponding to the capacitance of the measured capacitor when the touch panel is not touched; calculating a difference between the count value and the base count value when the base count value is set, for determining whether the touch panel is touched according to the difference; examining whether the count value is in a predetermined range; and performing a charging and discharging capacity setting process when the count value is out of the predetermined range, for adjusting the charging capacity and the discharging capacity.

The present invention further discloses a touch control device comprising a touch panel, a capacitance measurement device coupled to the touch panel for charging and discharging a measured capacitor of the touch panel by using a charging capacity and a discharging capacity and for generating a count value representing the capacitance of the measured capacitor according to a voltage signal on the measured capacitor, and a processing unit coupled to the capacitance measured device, for performing a touch detection process in which the processing unit adjusts the charging capacity and the discharging capacity used by the capacitance measurement device according to the count value, for determining whether the touch panel is touched.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
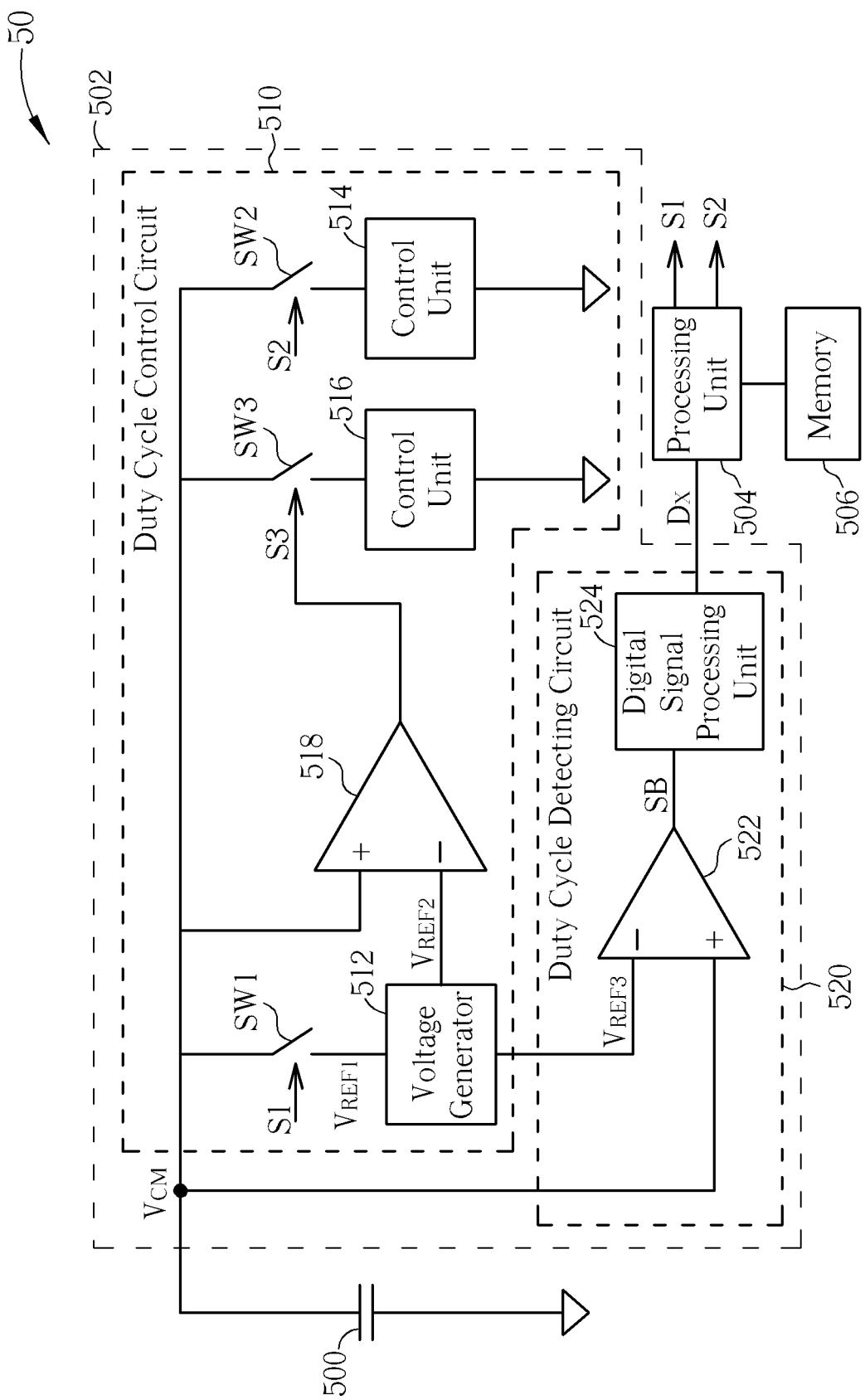
FIG. 5 is a schematic diagram of a touch control device according to an embodiment of the present invention.

Please refer to FIG. 5, which is a schematic diagram of a touch control device 50 according an embodiment of the present invention. The touch control device 50 comprises a measured capacitor 500, a capacitance measurement device 502, a processing unit 504, and a memory 506. The measured capacitor 500 is equivalent to a trace of a touch panel of the touch control device 50, connected to the capacitance measurement device 502 via a multiplexer, where the touch panel and the multiplexer are omitted in FIG. 5. The capacitance measurement device 502 comprises a duty cycle control circuit 510 and a duty cycle detecting circuit 520. The duty cycle control circuit 510 comprises a voltage generator 512, control units 514 and 516, an analog-to-digital (A/D) converter 518, and switches SW1-SW3. The duty cycle detecting circuit 520 comprises an A/D converter 522 and a digital signal processing unit 524.

Figure 1:
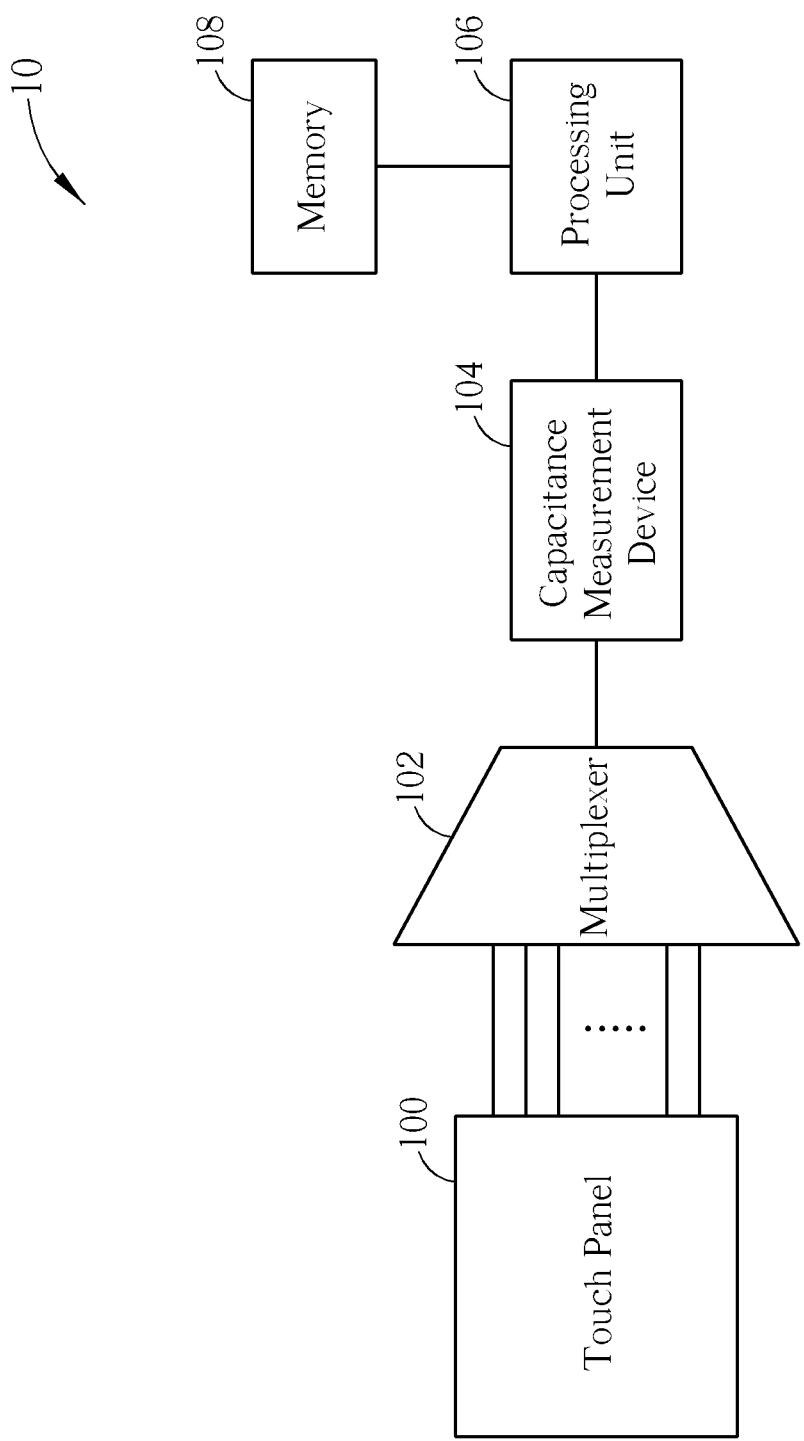
FIG. 1 is a schematic diagram of a touch control device according to the prior art.
Figure 2:
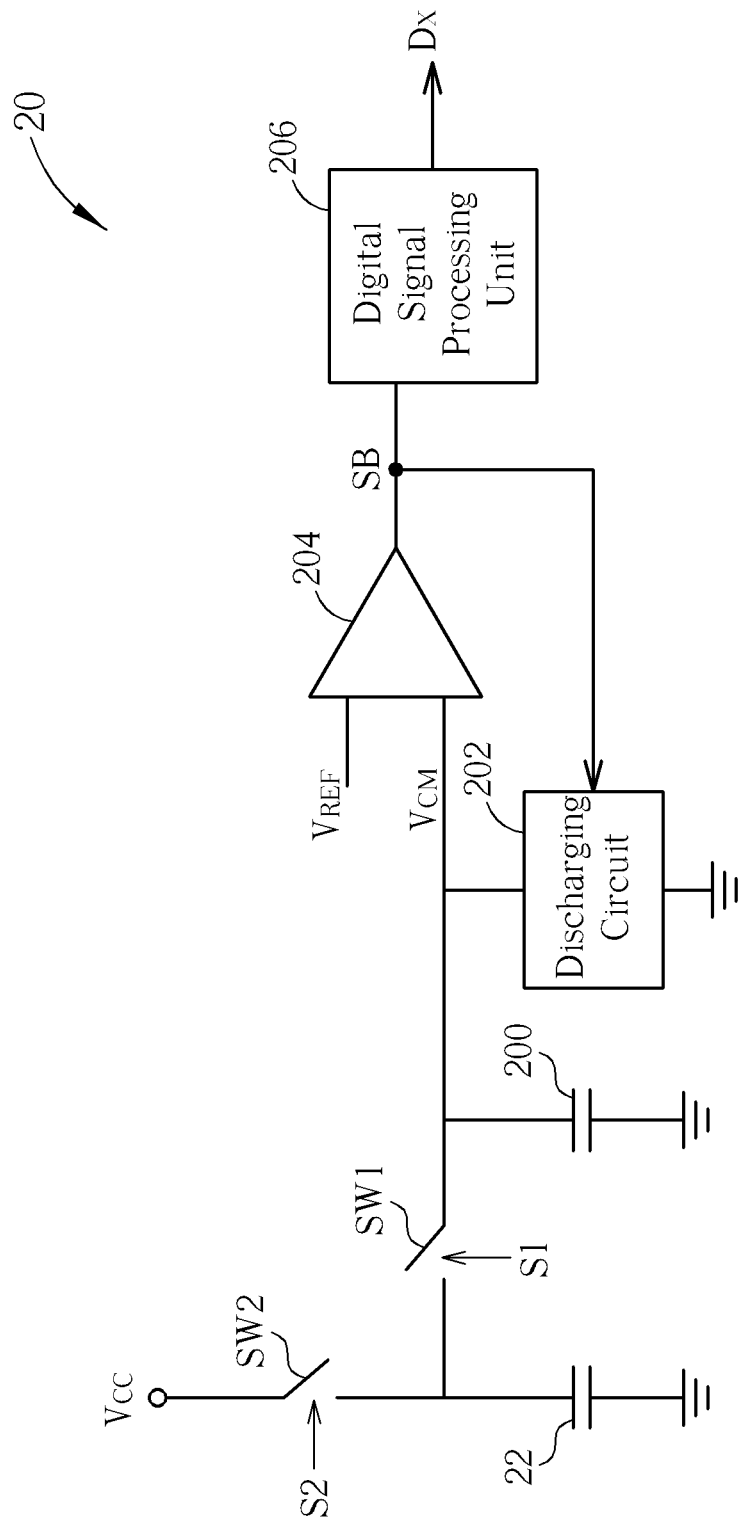
FIG. 2 is a schematic diagram of a capacitance measurement device based on a delta-sigma method according to the prior art.
Figure 3:
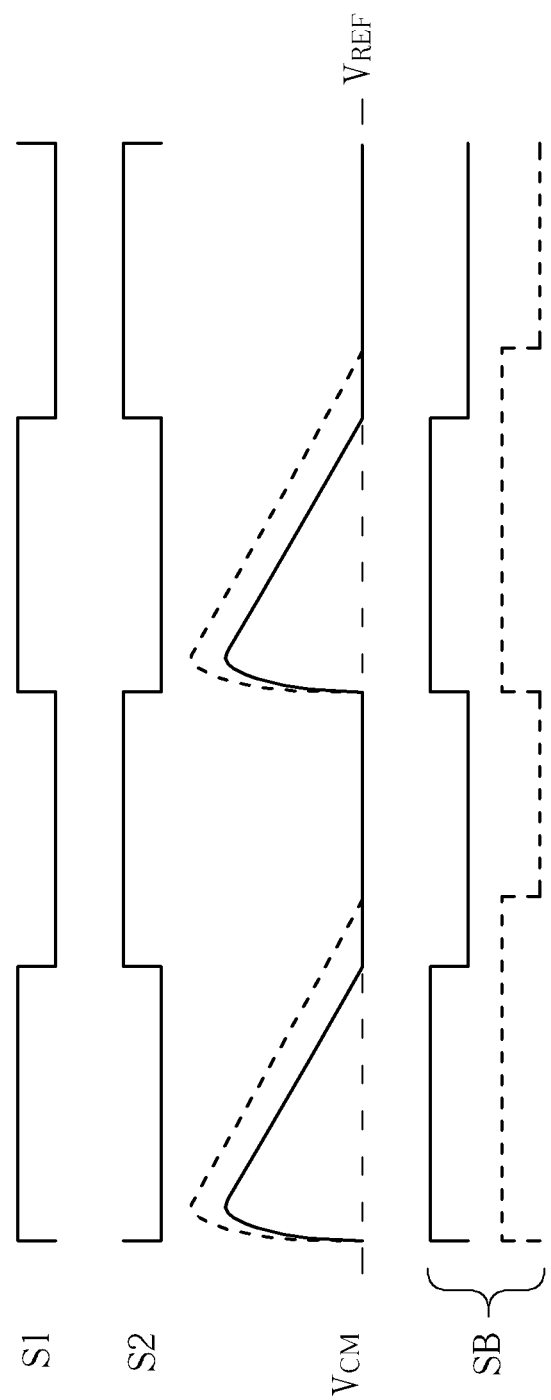
FIG. 3 and FIG. 4 are timing diagrams of signals with respect to the capacitance measurement device of FIG. 2 performing a charging and discharging procedure.
Figure 4:
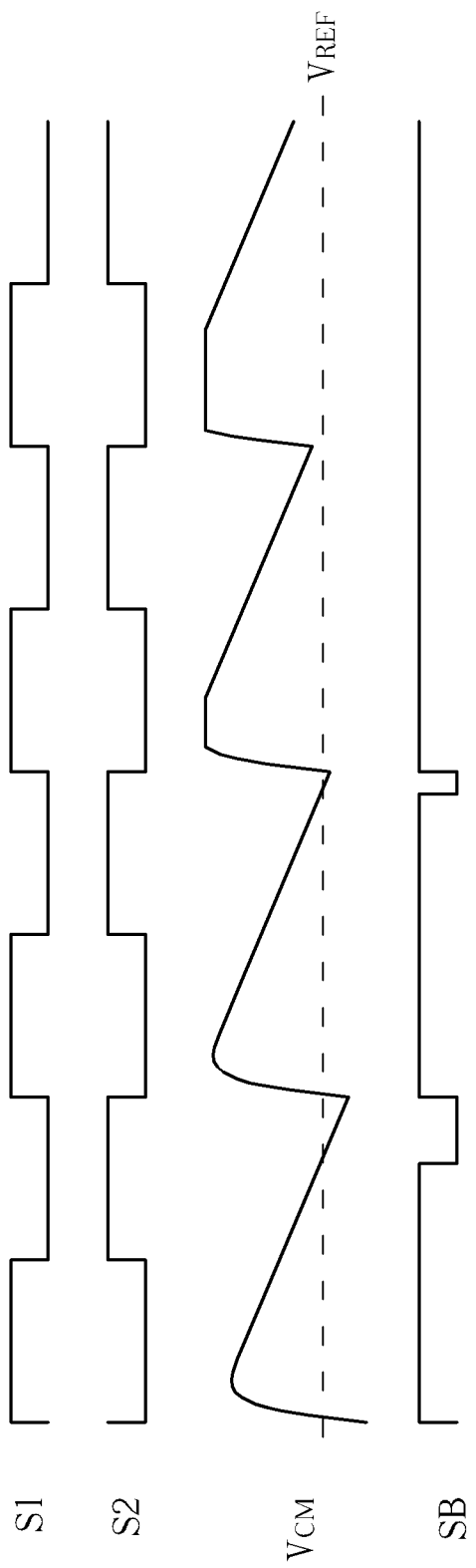

The capacitance measurement device 502 is utilized for measuring the capacitance of the measured capacitor 500 by charging and discharging the measured capacitor 500 and converting a voltage signal $V_{CM}$ on the measured capacitor 500 into a count value Dx that represents the capacitance of the measured capacitor 500. The memory 506 is utilized for storing a base count value corresponding to the environment capacitance of the touch panel of the touch control device 50. The processing unit 504 is coupled to the capacitance measurement device 502 and the memory 506, and is utilized for determining if a touch happens according to the difference between the count value Dx and the base count value stored in the memory 506. When the difference is large than a predetermined value, the processing unit 504 determines that a touch happens; otherwise, when the difference is smaller than the predetermined value, the processing unit 504 determines that no touch happens. Furthermore, the processing unit 504 adjusts the charging capacity or the discharging capacity that the capacitance measurement device 502 uses on the measured capacitor 500 according to the count value Dx, which is the major difference from the capacitance measurement device 20 of FIG. 2 that can only uses fixed charging/charging capacity.

The capacitance measurement device 502 is detailed described as follows. The duty cycle control circuit 510 is coupled to the measured capacitor 500 and the processing unit 504, and is utilized for charging and discharging the measured capacitor 500. The voltage generator 512 is utilized for generating reference voltages $V_{REF1}$, $V_{REF2}$ and $V_{REF3}$. The control units 514 and 516 are a pair of units for charging and discharging respectively; one of the control units 514 and 516 is designed to be in a charging configuration for charging the measured capacitor 500, also called a charging control unit, and the other is designed to be in a discharging configuration for discharging the measured capacitor 500, also called a discharging control unit. When the charging capacity or the discharging capacity is adjusted, the charging period or discharging period changes accordingly. The control units 514 and 516 can be implemented by hardware, which is not limited to any specified circuitry but ensures that the charging capacity and the discharging capacity are adjustable. For example, a simple circuit composed of a switch and a variable capacitor can be used as a control unit in the charging configuration, in which the variable capacitor can be pre-charged to a predetermined voltage level and then is charge transferred. For another example, a variable current source or a voltage source parallel with resisters can also be used as the control unit in the charging configuration. A variable current source or a circuit composed of resistors connected to ground can be used as the control unit in the discharging configuration.

Please note that, the capacitor in the charging control unit has a very small capacitance and can be integrated in an ASIC of the capacitance measurement device 502, which is different from an external integrating capacitor for a conventional capacitance measurement device. In this situation, cost of the external integrating capacitor is not required and electromagnetic interference in the external integrating capacitor is avoided, and therefore capacitance measurement accuracy is improved.

The switch SW1 is coupled to the voltage generator 512 and the measured capacitor 500, and is utilized for controlling a connection between the reference voltage $V_{REF1}$ and the measured capacitor 500 according to a signal S1. When the switch SW1 is turned on by the signal S1, the reference voltage $V_{REF1}$ generated from the voltage generator 512 pre-charges the measured capacitor 500 to make the voltage level on the measured capacitor 500 equal to the reference voltage $V_{REF1}$, which is used for decreasing measurement error. The switch SW2 is coupled to the control unit 514 and the measured capacitor 500, and is utilized for controlling a connection between the control unit 514 and the measured capacitor 500 according to a signal S2. When the switch SW2 is turned on by the signal S2, the control unit 514 charges or discharges the measured capacitor 500, which depends on the charging configuration or the discharging configuration the control unit 514 is in.

The A/D converter 518 is a 1-bit A/D converter, equivalent to a comparator. The A/D converter 518 is coupled to the voltage generator 512 and the measured capacitor 500, and is utilized for converting the voltage signal $V_{CM}$ on the measured capacitor 500 into a signal S3 according to the reference voltage $V_{REF2}$. In other words, the A/D converter 518 compares the voltage level of the voltage signal $V_{CM}$ with the reference voltage $V_{REF2}$ and generates a comparison result as the signal S3. The switch SW3 is coupled to the A/D converter 518, the control unit 516, and the measured capacitor 500, and is utilized for controlling a connection between the control unit 516 and the measured capacitor 500 according to the signal S3. When the switch SW3 is turned on by the signal S3, the control unit 516 discharges or charges the measured capacitor 500, which depends on the discharging configuration or the charging configuration the control unit 516 is in.

The A/D converter 522 is a 1-bit A/D converter, equivalent to a comparator. The A/D converter 522 is coupled to the voltage generator 512 and the measured capacitor 500, and is utilized for converting the voltage signal $V_{CM}$ into a signal SB according to the reference voltage $V_{REF3}$. The digital signal processing unit 524 is coupled to the A/D converter 522, and is utilized for converting the signal SB into a count value Dx after several times of charging and discharging periods and outputting the count value Dx to the processing unit 504. The digital signal processing unit 524 operates as an accumulator to sample the signal SB by a sampling rate and accumulate sampling results. From the above, the duty cycle detecting circuit 520 converts the voltage signal $V_{CM}$ into the count value Dx. Since the waveform of the voltage signal $V_{CM}$ describes the charging and discharging period of the measured capacitor 500, the count value Dx generated based on the voltage signal $V_{CM}$ represents the charging and discharging period of the measured capacitor 500 and thereby represents the capacitance of the measured capacitor 500.

Note that, whether the control unit 514 or the control unit 516 is in the charging configuration or the discharging configuration affects the priority of charging and discharging in the capacitance measurement device 502. When the control unit 514 is the charging control unit and the control unit 516 is the discharging control unit, the capacitance measurement device 502 first charges the measured capacitor 500 and then discharges the measured capacitor 500, in which the control unit 514 and the control unit 516 are in a charge-discharge configuration. On the other hand, when the control unit 514 is the discharging control unit and the control unit 516 is the charging control unit, the capacitance measurement device 502 first discharges the measured capacitor 500 and then charges the measured capacitor 500, in which the control unit 514 and the control unit 516 are in a discharge-charge configuration. Signals with respect to the control unit 514 and the control unit 516 when in the charge-discharge configuration or the discharge-charge configuration are respectively illustrated in FIG. 6 and FIG. 7.

Figure 6:
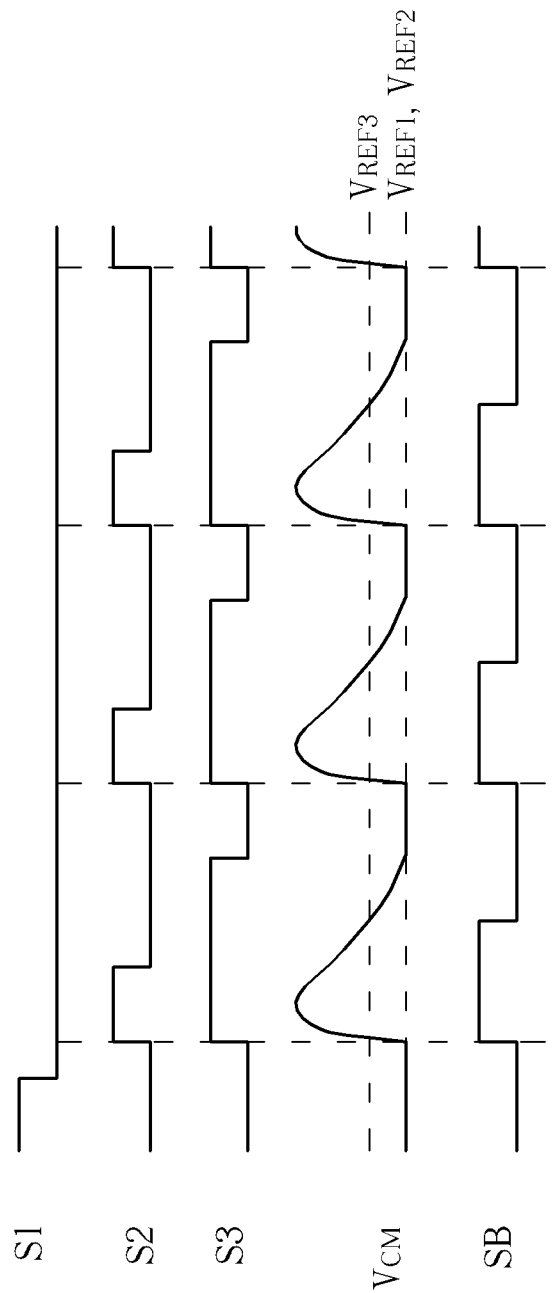
FIG. 6 is a timing diagram of signals with respect to the capacitance measurement device of FIG. 5 in a charge-discharge configuration.

FIG. 6 is a timing diagram of signals with respect to the capacitance measurement device 502 in the charge-discharge configuration performing a charging and discharging procedure, in which the signals S1-S3, the voltage signal $V_{CM}$, and the signal SB are illustrated. In the case of FIG. 6, the control unit 514 is the charging control unit, the control unit 516 is the discharging control unit, and the reference voltages are set to $V_{REF3} \geq V_{REF2} \approx V_{REF1}$. As shown in FIG. 6, the switch SW1 is turned on for a period of time when the charging and discharging procedure is initialized for pre-charging the measured capacitor 500 to reach the voltage level equal to the reference voltage $V_{REF1}$, and is turned off. When the switch SW2 is turned on, the control unit 514 performs charge transfer, to charge the measured capacitor 500. Since the reference voltage $V_{REF2}$ is close to the reference voltage $V_{REF1}$, the voltage level of the voltage signal $V_{CM}$ soon rises to be equal to or higher than the reference voltage $V_{REF2}$. At the same time, the switch S3 is turned on by the signal S3 outputted from the A/D converter 518 so that the control unit 516 starts to discharge the measured capacitor 500. The control unit 516 discharges the measured capacitor 500 until the switch SW3 is turned off when the voltage level of the voltage signal $V_{CM}$ decreases to be lower than or equal to the reference voltage $V_{REF2}$. Note that, the time between when the control unit 514 performs charging transfer and when the control unit 516 stops discharging is regarded as a charging and discharging period. After the control unit 514 and the control unit 516 operate for a predetermined time of several charging and discharging periods, the digital signal processing unit 524 converts the signal SB into the count value Dx.

Note that, the reference voltages setting $V_{REF3} \geq V_{REF2} \approx V_{REF1}$ in the example of FIG. 6 is one of embodiments of the present invention. The reference voltages setting can be $V_{REF3} \geq V_{REF2} \geq V_{REF1}$ for the case when the measured capacitor 500 has a large capacitance when the capacitance measurement device 502 is in the charge-discharge configuration. In such as situation of $V_{REF3} \geq V_{REF2} \geq V_{REF1}$, the control unit 514 needs to perform charge transfer for much more time in order to charge the measured capacitor 500 and make the voltage signal $V_{CM}$ to reach a voltage level higher than the reference voltages $V_{REF3}$ and $V_{REF2}$.

Figure 7:
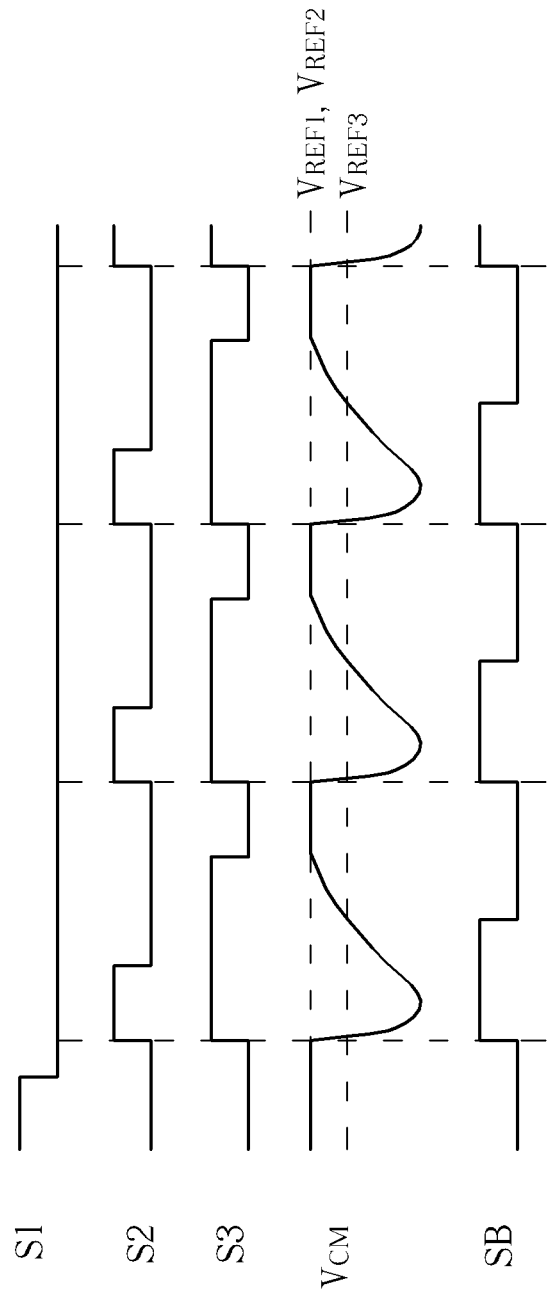
FIG. 7 is a timing diagram of signals with respect to the capacitance measurement device of FIG. 5 in a discharge-charge configuration.

FIG. 7 is a timing diagram of signals with respect to the capacitance measurement device 50 in the discharge-charge configuration performing a charging and discharging procedure. In the case of FIG. 7, the control unit 514 is the discharging control unit, the control unit 516 is the charging control unit, and the reference voltages are set to $V_{REF3} \leq V_{REF2} \approx V_{REF1}$. As shown in FIG. 7, the switch SW1 is turned on for a period of time when the charging and discharging procedure is initialized for pre-charging the measured capacitor 500 to reach the voltage level of the reference voltage $V_{REF1}$. When the switch SW2 is turned on, the control unit 514 performs charge transfer to discharge the measured capacitor 500. When the voltage level of the voltage signal $V_{CM}$ decreases to be lower than or equal to the reference voltage $V_{REF2}$, the switch SW3 is turned on by the signal S3 and the control unit 516 starts to charge the measured capacitor 500. The control unit 516 charges the measured capacitor 500 until the switch SW3 is turned off when the voltage level of the voltage signal $V_{CM}$ increases to be higher than or equal to the reference voltage $V_{REF2}$. Also, after the control unit 514 and the control unit 516 operate for several charging and discharging periods, the digital signal processing unit 524 converts the signal SB into the count value Dx. Note that, the reference voltages setting $V_{REF3} \leq V_{REF2} \approx V_{REF1}$ in the example of FIG. 7 is one of embodiments of the present invention. The reference voltages setting can be $V_{REF3} \leq V_{REF2} \leq V_{REF1}$ for the case when the measured capacitor 500 has a large capacitance when the capacitance measurement device 502 is in the discharge-charge configuration.

The processing unit 504 is coupled to the control units 514 and 516, the digital signal processing unit 524, and the memory 506. As mentioned previously, the processing unit 504 determines if a touch happens according to the difference between the count value Dx and the base count value and for adjusting the charging/discharging capacity the duty cycle control circuit 510 uses according to the count value Dx. In addition, the signals S1 and S2 for controlling the switches SW1 and SW2 are generated by the processing unit 504.

Figure 8:
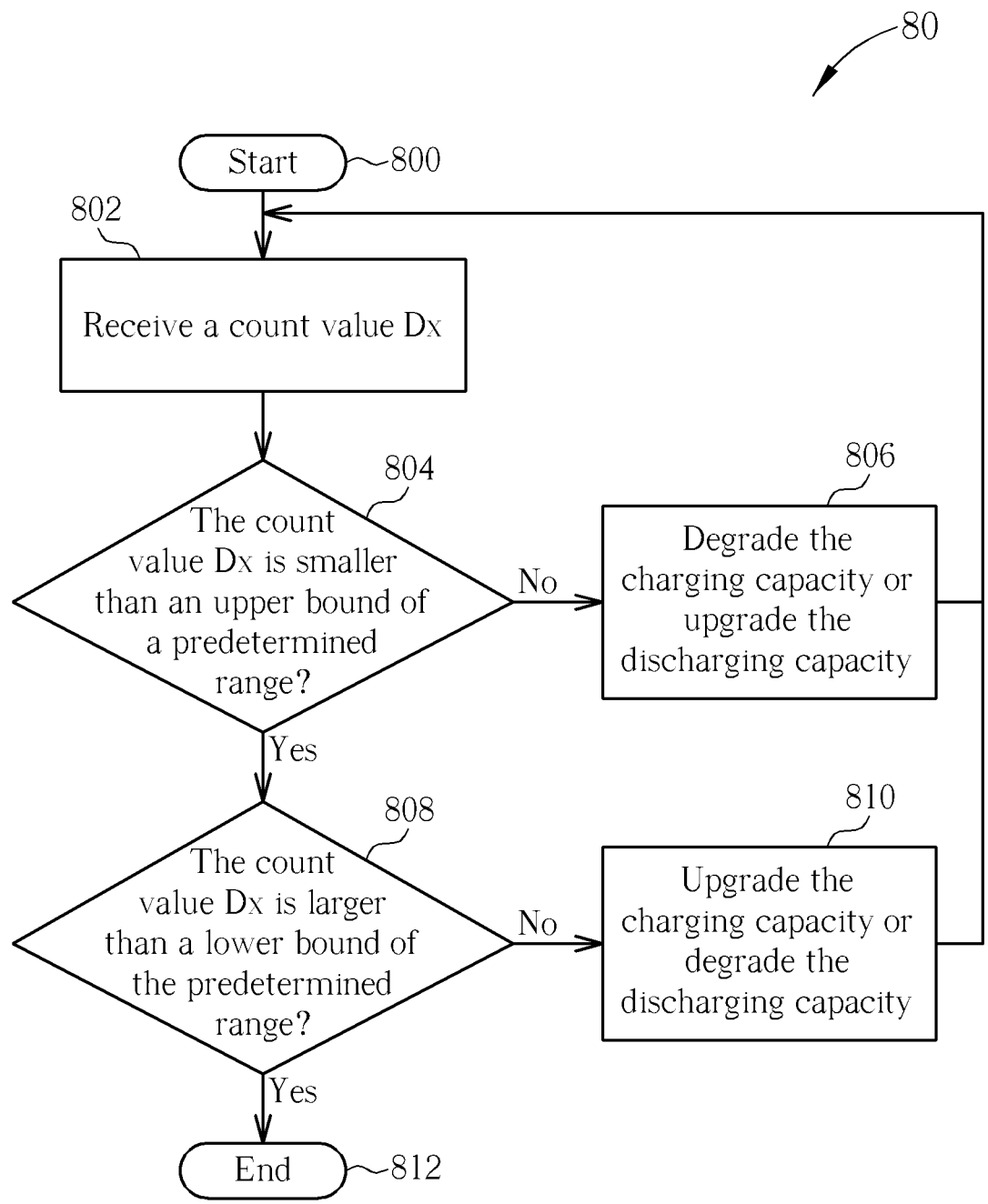
FIG. 8 is a flowchart of a process according to an embodiment of the present invention.

How the processing unit 504 adjusts the charging/discharging capacity is illustrated in FIG. 8, which is a flowchart of a process 80 according to an embodiment of the present invention. The process 80 is utilized in the processing unit 504 for determining the charging/discharging capacity of the capacitance measurement device 502. The process 80 includes the following steps:

Step 800: Start.

Step 802: Receive a count value Dx corresponding to the voltage signal $V_{CM}$ on the measured capacitor 500.

Step 804: Determine whether the count value Dx is smaller than an upper bound of a predetermined range. If the count value is smaller than the upper bound, perform Step 808; else, perform Step 806.

Step 806: Degrade the charging capacity of the capacitance measurement device 502 or upgrade the discharging capacity of the capacitance measurement device 502.

Step 808: Determine whether the count value Dx is larger than a lower bound of the predetermined range. If the count value is larger than the lower bound, perform Step 812; else, perform Step 810.

Step 810: Upgrade the charging capacity of the capacitance measurement device 502 or degrade the discharging capacity of the capacitance measurement device 502.

Step 812: End.

According to the process 80, the processing unit 504 determines whether the count value Dx is too large or small based on an acceptable predetermined range DL-DU and adjusts the charging capacity or the discharging capacity accordingly. A count value out of the predetermined range DL-DU intends that the environment capacitance of the touch panel may change as a result of temperature/humidity variance or dust accumulating on the touch panel. The predetermined range DL-DU can be defined according to a maximum count value that the processing unit 504 possibly receives. For example, the upper bound DU is set to 80% of the maximum count value and the lower bound DL is set to 20% of the maximum count value.

Step 804 and Step 808 can be combined to a step of determining whether the count value Dx is in the predetermined range, and Step 806 and Step 810 can be combined to a step of adjusting the charging capacity or the discharging capacity of the capacitance measurement device 502. When the count value Dx is larger than the upper bound DU, the processing unit 504 determines that the count value Dx is too large to be acceptable and thereby degrades the charging capacity or upgrades the discharging capacity. When the count value Dx is smaller than the lower bound DL, the processing unit 504 determines that the count value Dx is too small to be acceptable and thereby upgrades the charging capacity or degrades the discharging capacity. The processing unit 504 performs adjustment to the charging/discharging capacity until the received count value Dx falls in the predetermined range DL-DU, which means that the charging/discharging capacity at the moment is proper to be used. Note that, according to Step 806 and Step 810, the processing unit 504 can adjust both of the charging capacity and the discharging capacity of the capacitance measurement device 502, or adjust only one of the charging capacity and discharging capacity.

Figure 9:
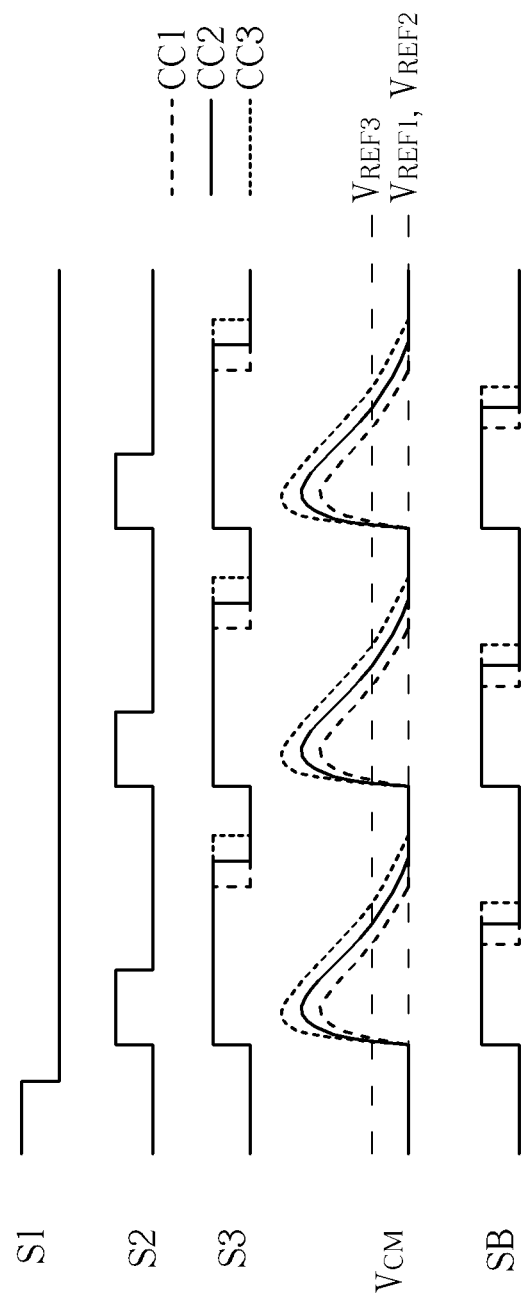
FIG. 9 is a timing diagram of signals with respect to the capacitance measurement device of FIG. 5 using the process of FIG. 8 for an illustration of adjustable charging capacity.

Please refer to FIG. 9, which is a timing diagram of signals with respect to the capacitance measurement device 502 in the charge-discharge configuration performing a charging and discharging procedure. FIG. 9 illustrates how the processing unit 504 adjusts the charging capacity by using the process 80. In the case of FIG. 9, the control unit 514 is assumed to have an adjustable charging capacity with three levels CC1, CC2, and CC3, and CC1<CC2<CC3. Waveforms corresponding to the charging capacities CC1, CC2 and CC3 are depicted by a long-dashed line, a solid line, and a short-dashed line respectively. When the control unit 514 charges the measured capacitor 500 by using the charging capacity CC2 and the processing unit 504 determines that the count value Dx is larger than the upper bound of the predetermined range, which indicates that the duty cycle of the signal SB is too high, the processing unit 504 degrades the charging capacity from CC2 to CC1. As shown in FIG. 9, when the charging capacity CC1 is used, the voltage level of the voltage signal $V_{CM}$ rises gradually, not steeply as when the charging capacity CC2 is used. After the charging capacity is adjusted, the duty cycle of the signal SB decreases, and the duty cycle detecting circuit 520 generates a smaller count value Dx accordingly.

Similarly, when the control unit 514 charges the measured capacitor 500 by using the charging capacity CC2 and the processing unit 504 determines that the count value Dx is smaller than the lower bound of the predetermined range, which indicates that the duty cycle of the signal SB is too low, the processing unit 504 upgrades the charging capacity from CC2 to CC3. As shown in FIG. 9, when the charging capacity CC3 is used, the duty cycle of the signal SB is higher compared with the duty cycle when the charging capacity CC2 is used, and in this situation, the duty cycle detecting circuit 520 generates a larger count value Dx. After one or several times of charging capacity adjustments, the processing unit 504 determines a proper charging capacity for the control unit 514.

Figure 10:
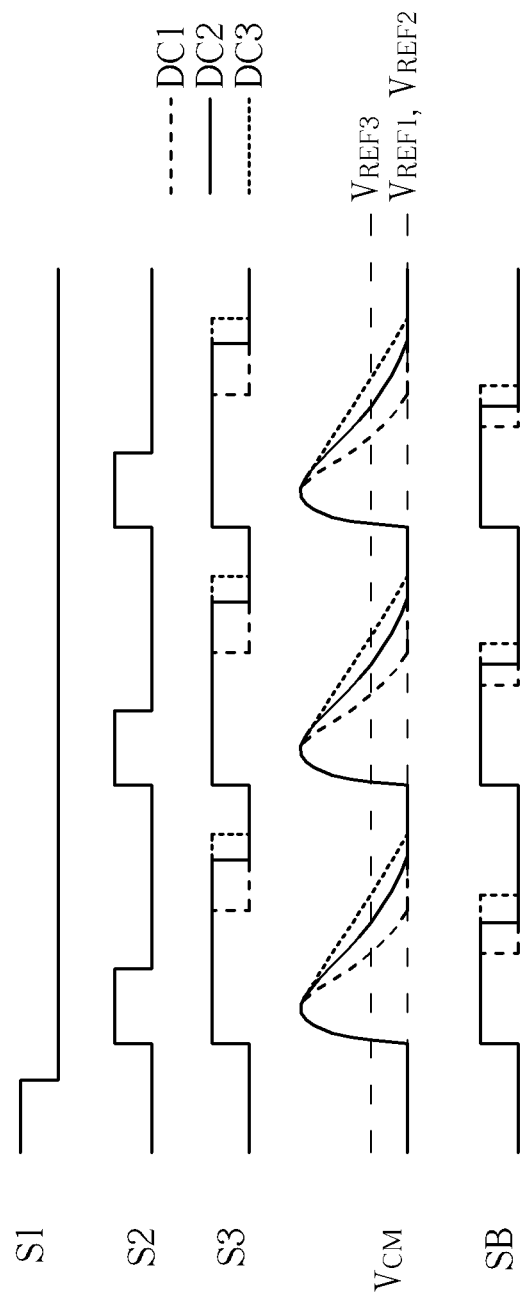
FIG. 10 is a timing diagram of signals with respect to the capacitance measurement device of FIG. 5 using the process of FIG. 8 for an illustration of adjustable discharging capacity.

Please refer to FIG. 10, which is a timing diagram of signals with respect to the capacitance measurement device 502 in the charge-discharge configuration performing a charging and discharging procedure. FIG. 10 illustrates how the processing unit 504 adjusts the discharging capacity by using the process 80. In the case of FIG. 10, the control unit 516 is assumed to have an adjustable discharging capacity with three levels DC1, DC2, and DC3, and DC1>DC2>DC3. Waveforms corresponding to the discharging capacities DC1, DC2 and DC3 are depicted by a long-dashed line, a solid line, and a short-dashed line respectively. When the control unit 516 discharges the measured capacitor 500 by using the discharging capacity DC2 and the processing unit 504 determines that the count value Dx is larger than the upper bound of predetermined range, which indicates that the duty cycle of the signal SB is too high, the processing unit 504 upgrades the discharging capacity from DC2 to DC1 to shorten the discharging period. When the discharging capacity DC1 is used, the voltage level of the voltage signal $V_{CM}$ falls below the reference voltage $V_{REF3}$ more quickly than it does when the discharging capacity DC2 is used, and the duty cycle of the signal SB is comparatively low. Therefore, the duty cycle detecting circuit 520 generates a smaller count value Dx accordingly.

Similarly, when the control unit 516 discharges the measured capacitor 500 by the discharging capacity DC2 and the processing unit 504 determines that the count value Dx is smaller than the lower bound of the predetermined range, which indicates that the duty cycle of the signal SB is too low, the processing unit 504 degrades the discharging capacity from DC2 to DC3 to extend the discharging period. As a result, the duty cycle of the signal SB increases, and the duty cycle detecting circuit 520 generates a larger count value Dx accordingly. After one or several times of discharging capacity adjustments, the processing unit 504 determines a proper discharging capacity for the control unit 516.

FIG. 9 and FIG. 10 illustrate the relationship between the charging/discharging capacity and the duty cycle of the signal SB for the capacitance measurement device 502 in the charge-discharge configuration. In a similar manner, for the capacitance measurement device 502 in the discharge-charge configuration, the processing unit 504 can also adjust the discharging capacity of the control unit 514 or the charging capacity of the control unit 516, which are omitted herein.

From the above, the received count value Dx in the predetermined range indicates that the processing unit 504 determines a proper charging capacity for the control unit 514 or a proper discharging capacity for the control unit 516, which is suitable to be used in the situation that the environment capacitance is changed. Therefore, a too large or too small count value caused by the improper charging/discharging capacity is prevented, and accuracy of touch detection is enhanced.

For a conventional touch control device, when the environment capacitance of the trace of a touch panel changes due to temperature/humidity variance or dust on the touch panel, the capacitance measurement device may generate a count value out of the acceptable range, which is not proper for determining if a touch happens. Moreover, the charging/discharging capacity used in the conventional capacitance measurement device is not adjustable. Therefore, the processing unit in the touch control device cannot receive a count value that precisely represents the capacitance of the measured capacitor, and the touch event cannot be detected precisely. In comparison, in the touch control device 50, when the count value Dx generated from the capacitance measurement device 502 is too large or too small, the processing unit 504 adjusts the charging/discharging capacity on the measured capacitor 500 according to the count value Dx, so that the charging/discharging capacity is properly used for a current environment of the touch panel. After the charging/discharging capacity is adjusted, the count value Dx falls in the acceptable predetermined range, and the capacitance measurement device 502 obtains the precise capacitance of the measured capacitor. Therefore, the processing unit 504 can detect if a touch happens more precisely.

Figure 11:
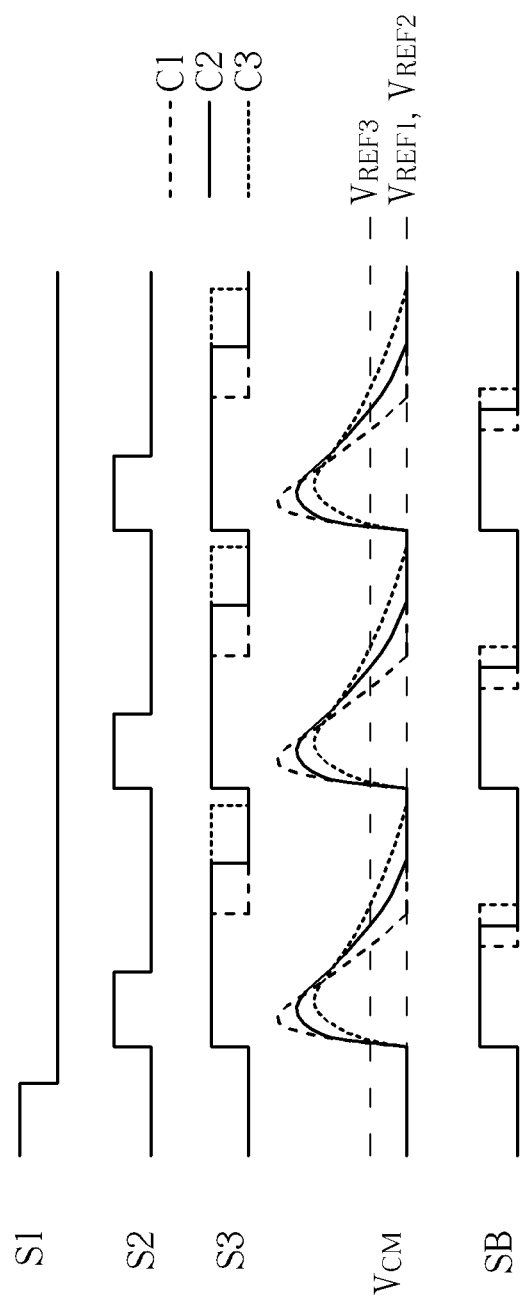
FIG. 11 is a timing diagram of signals with respect to the capacitance measurement device of FIG. 5 under different measured capacitances.

Please refer to FIG. 11, which is a timing diagram of signals with respect to the capacitance measurement device 502 in the charge-discharge configuration performing a charging and discharging procedure. In FIG. 11, waveforms corresponding to the measured capacitor 500 of different capacitances C1, C2 and C3 are depicted by a long-dashed line, a solid line, and a short-dashed line respectively, and C1<C2<C3. According to the principle V=Q/C, when the capacitance of the measured capacitor 500 increases from C2 to C3 and the charging capacity is not changed, the maximum voltage level of the voltage signal $V_{CM}$ decreases; and when the capacitance of the measured capacitor 500 decreases from C2 to C1 and the charging capacity is not changed, the maximum voltage level of the voltage signal $V_{CM}$ increases. In another aspect based on the principle of RC time constant, when the capacitance of the measured capacitor 500 increases from C2 to C3, the required discharging period is extended and the duty cycle of the signal SB increases; and when the capacitance of the measured capacitor 500 decreases from C2 to C1, the required discharging period is shortened and the duty cycle of the signal SB decreases. From the above, the duty cycle of the signal SB represents the capacitance of the measured capacitor 500. In another embodiment of the present invention, the capacitance measurement device 502 in the discharge-charge configuration can also knows that the duty cycle of the signal SB represents the capacitance of the measured capacitor 500, which is omitted herein.

Figure 12:
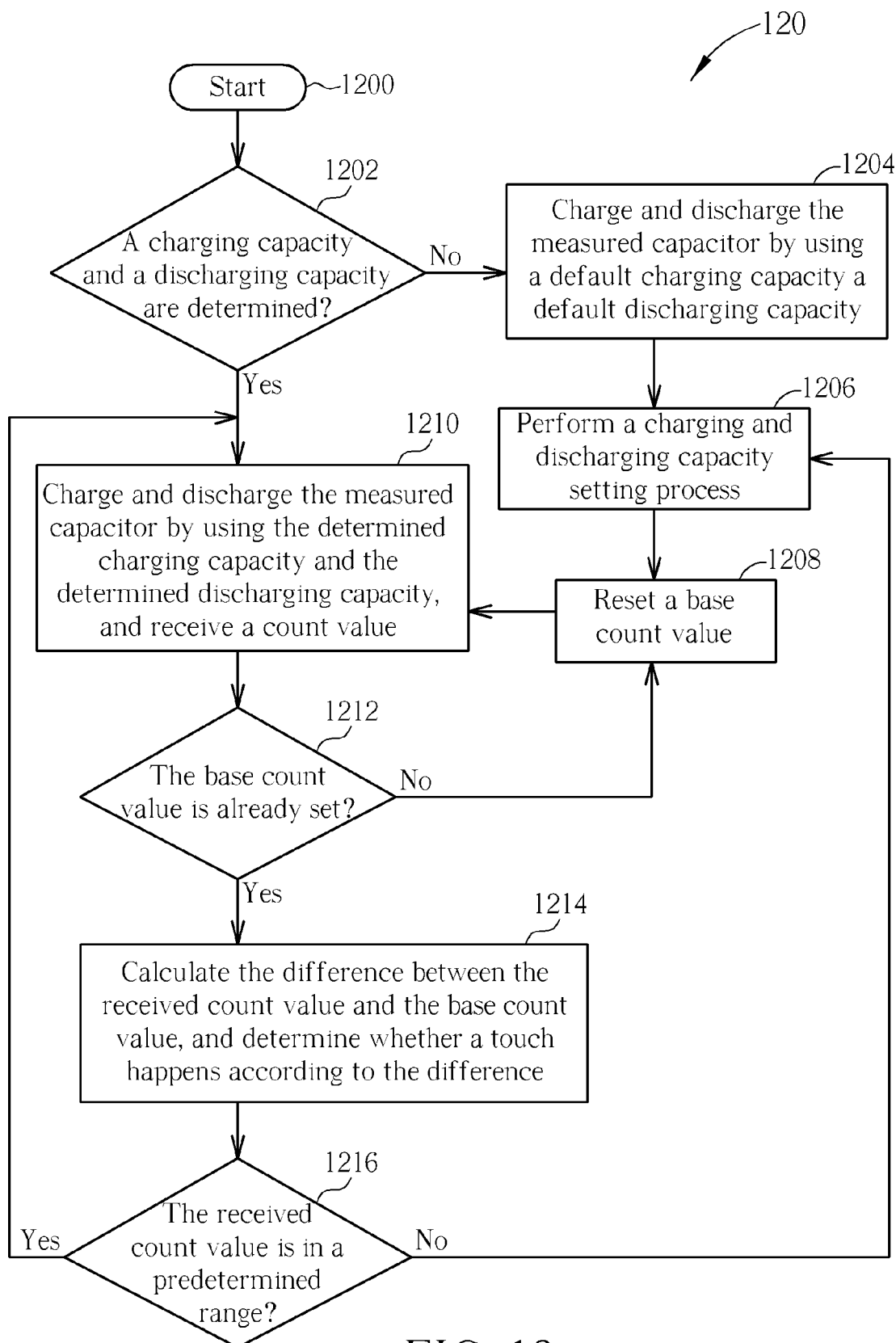
FIG. 12 is a flowchart of a process according to an embodiment of the present invention.

Please refer to FIG. 12, which is a flowchart of a process 120 according to an embodiment of the present invention. The process 120 is a touch detection process utilized in the processing unit 504 for detecting whether a touch happens. The process 120 includes the following steps:

Step 1200: Start.

Step 1202: Examine whether a charging capacity and a discharging capacity of the capacitance measurement device 502 are determined. If the charging capacity and the discharging capacity are not determined yet, perform Step 1204; else, perform Step 1210.

Step 1204: Charge and discharge the measured capacitor 500 by using a default charging capacity and a default discharging capacity.

Step 1206: Perform a charging and discharging capacity setting process.

Step 1208: Reset a base count value corresponding to the environment capacitance according to a count value currently received.

Step 1210: Charge and discharge the measured capacitor 500 by using the determined charging capacity and the determined discharging capacity, and receive a count value from the capacitance measurement 502.

Step 1212: Examine whether the base count value is already set. If the base count value is set, perform Step 1214; else, perform Step 1208.

Step 1214: Calculate the difference between the received count value and the base count value and determine whether a touch happens according to the difference between the received count value and the base count value.

Step 1216: Examine whether the received count value is in a predetermined range. If the received count value is in the predetermined range, return to Step 1210; else, perform Step 1206.

When the capacitance measurement device 502 is initially connected to the measured capacitor 500, the charging capacity and the discharging capacity may not be determined yet. According to Step 1202, the processing unit 504 firstly examines whether the charging capacity and the discharging capacity of the control units 514 and 516 are successfully determined. If the processing unit 504 examines and knows that the charging capacity and the discharging capacity are not determined yet, the processing unit 504 sets the charging/discharging capacity to a default charging/discharging capacity, and then charges and discharges the measured capacitor 500 by using the default charging capacity and the default discharging capacity. After a period of time (which is equal to several charging periods and discharging periods, for example), the processing unit 504 performs a charging and discharging capacity setting process as the process 80 of FIG. 80, through which the processing unit 504 can determine the most proper charging capacity and discharging capacity. After the charging capacity and the discharging capacity are determined through the process 80, according to Step 1208, the processing unit 504 resets the base count value according to the received count value Dx. Note that, when the charging and discharging capacity setting process is performed for the first time, the processing 504 directly sets the base count value to be equal to the received count value Dx since the capacitance measurement device 502 may be initially connected to the measured capacitor 500 and thus no base count value corresponding to the measured capacitor 500 is stored the memory 506.

After the first time charging and discharging capacity setting process is completed and the base count value is set, or after the processing unit 504 examines and knows that the charging capacity and the discharging capacity are already determined, according to Step 1210, the processing unit 504 charges and discharges the measured capacitor 500 by using the determined charging capacity and the determined discharging capacity, and receives a count value from the capacitance measurement 502. According to Step 1212, the processing unit 504 examines whether the base count value is set. If the base count value is not set yet, the processing unit 504 sets the base count value to be equal to the received count value Dx (as Step 1208). Otherwise, if the base count value is set already, according to Step 1214, the processing unit 504 calculates the difference between the received count value Dx and the base count value and thereby determines whether a touch happens according to the difference.

When determining a touch happens, according to Step 1216, the processing unit 504 also examines whether the received count value Dx is in a predetermined range as the range of DL-DU used in the process 80. When the count value Dx is in the predetermined range, the charging capacity and the discharging capacity currently used are considered suitable for the measured capacitor 500 and thereby serious touch detection error due to a too long/short charging and discharging period does not happen; in this situation, the processing unit 504 performs Step 1210 to control the capacitance measurement device 502 to charge and discharge the measured capacitor 500 by using the current charging capacity and the current discharging capacity. Otherwise, when the count value Dx is out of the predetermined range, which implies that the environment capacitance of the touch panel may already change such that the charging capacity or the discharging capacity currently used is not proper and cannot generate a correct touch detection, the processing unit 504 performs the charging and discharging capacity setting process as the process 80, to adjust the charging capacity and the discharging capacity of the capacitance measurement device 502.

Please note that, for the case that the charging and discharging capacity setting process is not performed for the first time, the processing unit 504 performs a weighted average operation on the base count value and the received count value Dx, which means that the new base count value is the weighted sum of base count value and received count value Dx (e.g. the base count value is A % of the new base count value and the received count value Dx is (1−A %) of the new base count value), instead of directly setting the base count value to the received count value. That is, the base count value is smoothly changed and is not seriously affected by dramatic environment change.

Briefly, through the process 120, the processing unit 504 does not only adjusts the charging capacity and the discharging capacity on the measured capacitor 500 when the environment capacitance changes, but also resets the base count value used for determining whether a touch happens when required. In a conventional capacitance measurement device of a touch control device, the charging/discharging capacity cannot be adjusted and the based count value cannot be renewed; in comparison, through the process 80 and the process 120, the charging/discharging capacity used in the capacitance measurement device 502 of the touch control device 50 can be adjusted, and the base count value can be renewed. As a result, touches happening on the touch panel of the touch control device can be correctly detected by using the precise base count value, and the capacitance measurement device 502 is suitable for touch panels of different characteristics.

Figure 13:
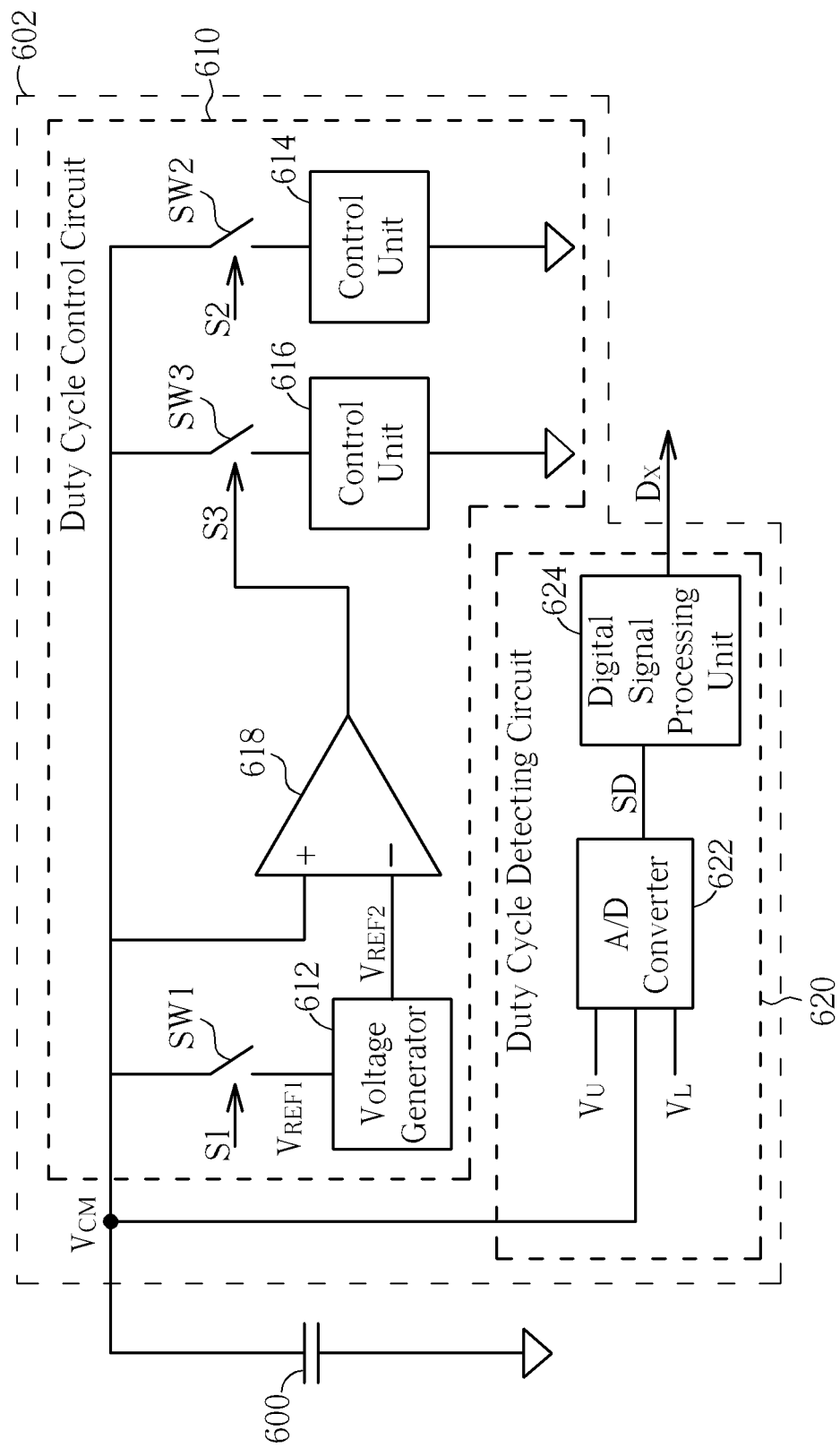
FIG. 13 is a schematic diagram of a capacitance measurement device according an embodiment of the present invention.

The capacitance measurement device 502 of FIG. 5 is one of embodiments of the present invention, and those skilled in the art can make alterations and modifications accordingly. Please refer to FIG. 13, which is a schematic diagram of a capacitance measurement device 602 according to an embodiment of the present invention. The capacitance measurement device 602 comprises a duty cycle control circuit 610 and a duty cycle detecting circuit 620. The duty cycle control circuit 610 comprises a voltage generator 612, control units 614 and 616, an A/D converter 618, and switches SW1-SW3. The duty cycle detecting circuit 620 comprises an A/D converter 622 and a digital signal processing unit 624. Please note that, the A/D converter 622 is an N-bit A/D converter and N is an integer larger than 1, different from the 1-bit A/D converter 522 in the capacitance measurement device 502. Units in the capacitance measurement device 602 other than the A/D converter 622 are similar to those corresponding units in the capacitance measurement device 502 and are not detailed described herein.

The A/D converter 622 is coupled to a measured capacitor 600 and the digital signal processing unit 624, and is utilized for converting the voltage signal $V_{CM}$ on the measured capacitor 600 into an N-bit signal SD according to reference voltages in a range from a reference voltage $V_L$ to a reference voltage $V_U$. The signal SD is outputted to the digital signal processing unit 624. When the capacitance measurement device 602 is in the charge-discharge configuration, which indicates that the control unit 614 is the charging control unit and the control unit 616 is the discharging control unit, the reference voltage range $V_L$-$V_U$ is set to be higher than the reference voltage $V_{REF1}$ generated by the voltage generator 612 for pre-charging and the reference voltage $V_{REF2}$ used by the A/D converter 618. On the other hand, when the capacitance measurement device 602 is in the discharge-charge configuration, which indicates that the control unit 614 is the discharging control unit and the control unit 616 is the charging control unit, the reference voltage range $V_L$-$V_U$ is set to be lower than the reference voltages $V_{REF1}$ and $V_{REF2}$. The digital signal processing unit 624 converts the signal SD into a count value Dx and outputs the count value Dx to a rear-stage processing unit (which is not shown in FIG. 13) for charging/discharging capacity adjustment.

Figure 14:
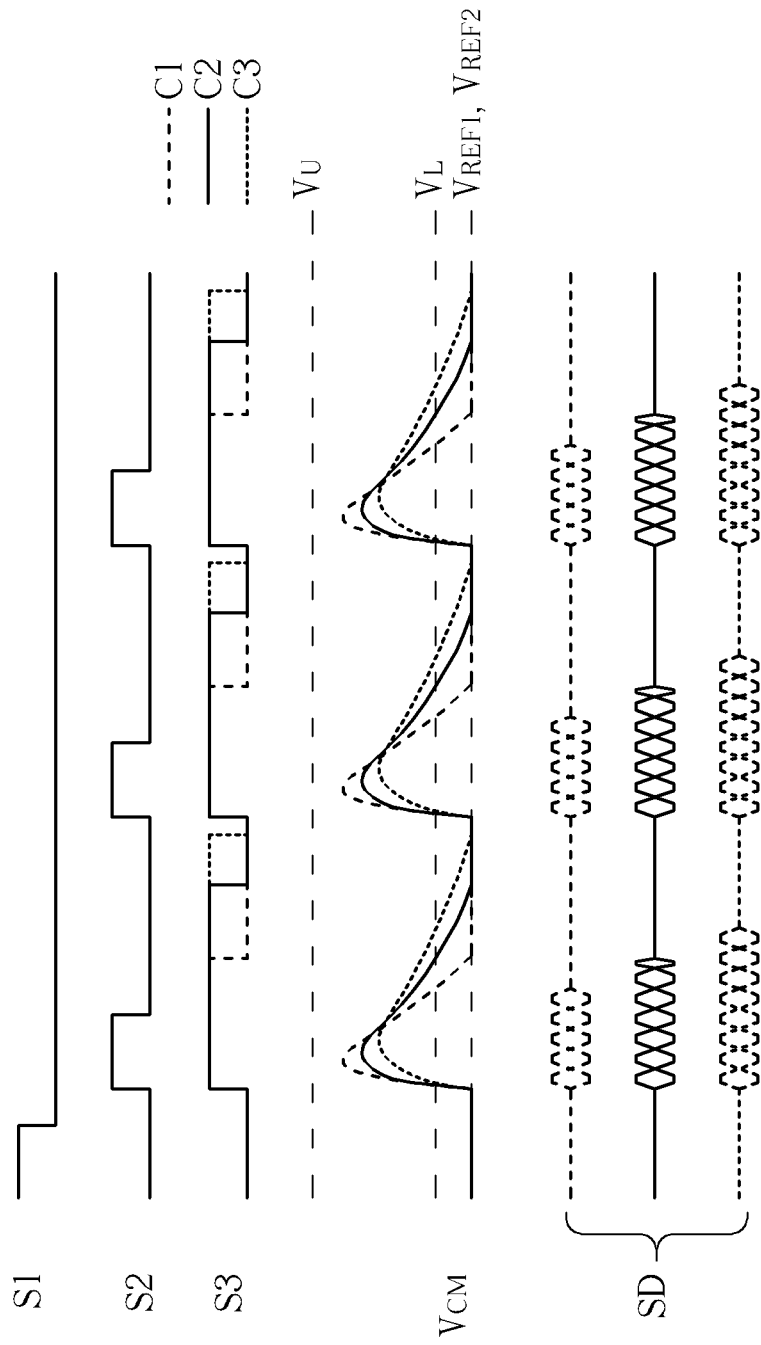
FIG. 14 is a timing diagram of signals with respect to the capacitance measurement device of FIG. 13 in a charge-discharge configuration under different measured capacitances.
Figure 15:
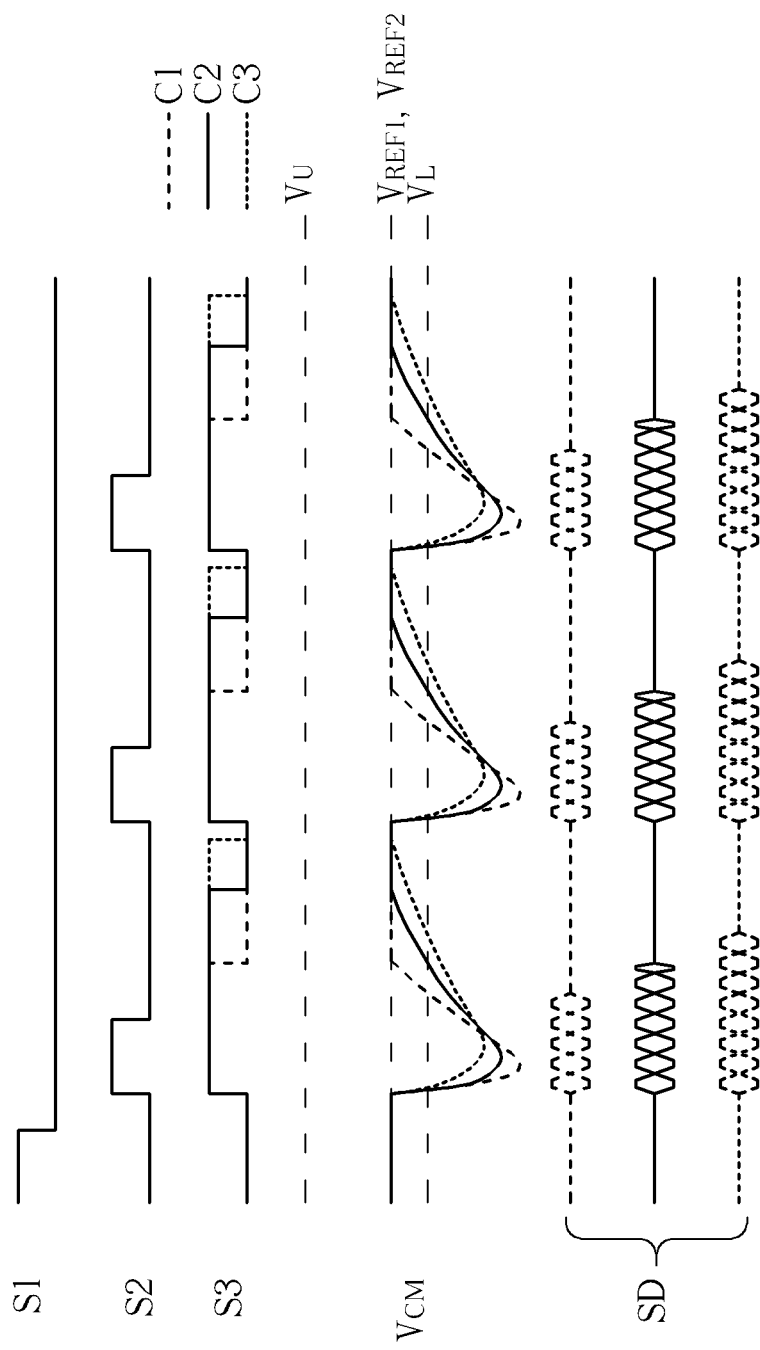
FIG. 15 is a timing diagram of signals with respect to the capacitance measurement device of FIG. 13 in a discharge-charge configuration under different measurement capacitances.

FIG. 14 and FIG. 15 are timing diagrams of signals with respect to the capacitance measurement device 602 in the charge-discharge configuration and in the discharge-charge configuration respectively, performing a charging and discharging procedure, in which signals S1-S3 controlling the switches SW1-SW3, the voltage signal $V_{CM}$, and the signal SD are illustrated. Waveforms of the signal S3, the voltage signal $V_{CM}$, and the signal SD are depicted by a long-dashed line, a solid line, and a short-dashed line for indicating cases of different measured capacitance C1, C2 and C3, and C1<C2<C3. As shown in FIG. 14 and FIG. 15, the duty cycle of the signal SD represents the measured capacitance. Therefore, the rear-stage processing unit can adjust the charging/discharging capacity of the control unit 614 or the control unit 616 according to the count value Dx.

Figure 16:
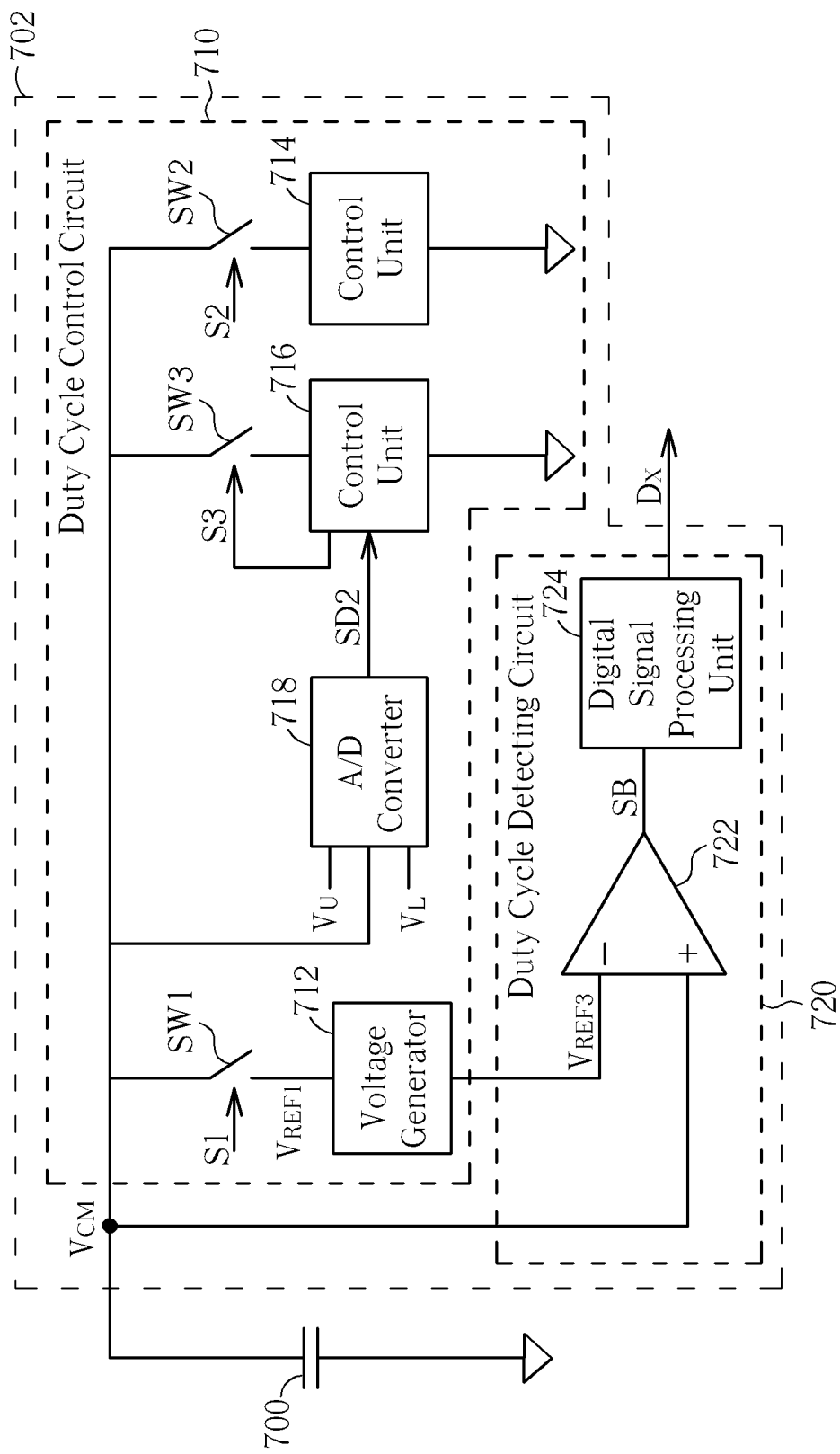
FIG. 16 is a schematic diagram of a capacitance measurement device according to an embodiment of the present invention.

In the capacitance measurement device 502 of FIG. 5, the charging/discharging capacity of the control unit 516 is adjusted by the processing unit 504 according to the count value Dx. In another embodiment of the present invention, the charging/discharging capacity of the control units in charge-discharge configuration or in discharge-charge configuration is adjusted according to the voltage signal on the measured capacitor and is not adjusted by the rear-stage processing unit. Please refer to FIG. 16, which is a capacitance measurement device 702 according to an embodiment of the present invention. The capacitance measurement device 702 comprises a duty cycle control circuit 710 and a duty cycle detecting circuit 720. The duty cycle control circuit 710 comprises a voltage generator 712, control units 714 and 716, an A/D converter 718, and switches SW1-SW3. The duty cycle detecting circuit 720 comprises an A/D converter 722 and a digital signal processing unit 724.

The difference between the capacitance measurement device 702 and the capacitance measurement device 502 is that the A/D converter 718 is an N-bit A/D converter and N is an integer larger than 1, not a 1-bit A/D converter. The A/D converter 718 is coupled to a measured capacitor 700 and the control unit 716, and is utilized for converting the voltage signal $V_{CM}$ on the measured capacitor 700 into an N-bit signal SD2 outputted to the control unit 716. The A/D converter 718 uses reference voltages in a range from a reference voltage signal $V_L$ to a reference voltage signal $V_U$. The control unit 716 selects a charging capacity (or a discharging capacity, depending on the charging or discharging configuration the control unit 716 is) among $2^N$ different capacity settings according to the signal SD2, to charge/discharge the measured capacitor 700. Compared to the capacitance measurement device 502 of FIG. 5, the charging/discharging capacity of the control unit 716 is set according to the signal SD2 instead of being decided by a rear-stage processing unit according to the count value.

Please note that, the connection between the control unit 716 and the measured capacitor 700 is controlled by a signal S3 outputted from the control unit 716, not controlled by the signal SD2. Please refer to the abovementioned capacitance measurement device 502 to realize how the charging/discharging capacity of the control unit 714 is adjusted, which is omitted herein.

In conclusion, through the capacitance measurement device and related processes according to the present invention, when the environment capacitance of the touch panel varies due to external environmental factors, or when the touch panels have different environment capacitors, the charging/discharging capacity of the capacitance measurement device can be adjusted and therefore touches are detected precisely.

Those skilled in the art will readily observe that numerous modifications and alterations of the device and method may be made while retaining the teachings of the invention.

What is claimed is:

1. A touch detection method for a touch control device including a touch panel, the touch detection method comprising:
    examining whether charging rate of a variable charging capacity for charging a measured capacitor of the touch panel and a discharging rate of a variable discharging capacity for discharging the measured capacitor are determined;
    when the charging rate of the variable charging capacity and the discharging rate of the variable discharging capacity are determined, charging and discharging the measured capacitor by using the variable charging capacity and the variable discharging capacity and receiving a count value representing the capacitance of the measured capacitor;
    examining whether a base count value is set, the base count value corresponding to the capacitance of the measured capacitor when the touch panel is not touched;
    when the base count value is set, calculating a difference between the count value and the base count value, for determining whether the touch panel is touched according to the difference;
    examining whether the count value is in a predetermined range; and
    when the count value is out of the predetermined range, performing a charging and discharging capacity setting process for adjusting the charging rate of the variable charging capacity and the discharging rate of the variable discharging capacity.

2. The touch detection method of claim 1, wherein the variable charging and discharging capacity setting process comprises:
    receiving the count value;
    determining whether the count value is in the predetermined range, for generating a determination result; and
    adjusting the charging rate of the variable charging capacity and the discharging rate of the variable discharging capacity according to the determination result.

3. The touch detection method of claim 2, wherein the step of adjusting the charging rate of the variable charging capacity and the discharging rate of the variable discharging capacity comprises:
    when the determination result indicates that the count value is larger than an upper bound of the predetermined range, decreasing the charging rate of the variable charging capacity.

4. The touch detection method of claim 2, wherein the step of adjusting the charging rate of the variable charging capacity and the discharging rate of the variable discharging capacity comprises:
    when the determination result indicates that the count value is larger than an upper bound of the predetermined range, increasing the discharging rate of the variable discharging capacity.

5. The touch detection method of claim 2, wherein the step of adjusting the variable charging capacity and the variable discharging capacity comprises
    when the determination result indicates that the count value is smaller than a lower bound of the predetermined range, increasing the charging rate of the variable charging capacity.

6. The touch detection method of claim 2, wherein the step of adjusting the variable charging capacity and the variable discharging capacity comprises:
    when the determination result indicates that the count value is smaller than a lower bound of the predetermined range, decreasing the discharging rate of the variable discharging capacity.

7. The touch detection method of claim 1 further comprising:
    resetting the base count value according to the received count value after the charging rate of the variable charging capacity and the discharging rate of the variable discharging capacity are adjusted.

8. The touch detection method of claim 7, wherein the step of resetting the base count value according to the received count value is performing a weighted average operation on the base count value and the received count value to generate a calculation result as a new base count value.

9. The touch detection method of claim 1 further comprising:
    when the charging rate of the variable charging capacity and the discharging rate of the variable discharging capacity are not determined yet, charging and discharging the measured capacitor by using a default rate of charging capacity and a default rate of discharging capacity;
    performing the variable charging and discharging capacity setting process; and
    setting the base count value to be equal to the received count value.

10. A touch control device comprising:
    a touch panel;
    a capacitance measurement device coupled to the touch panel, that charges and discharges a measured capacitor of the touch panel by using a selected charging rate of the variable charging capacity and a selected discharging rate of the variable discharging capacity, and that generates a count value representing the capacitance of the measured capacitor according to a voltage on the measured capacitor; and
    a processing unit coupled to the capacitance measured device, for performing a touch detection process in which the processing unit adjusts the charging rate for the variable charging capacity and the discharging rate for the variable discharging capacity according to the count value, for determining whether the touch panel is touched.

11. The touch control device of claim 10, wherein the touch detection process comprises:
    examining whether the charging rate for variable charging capacity and the discharging rate for the variable discharging capacity are determined;

when the charging rate for the variable charging capacity and the discharging rate for the discharging capacity are determined, controlling the capacitance measurement device to charge and discharge the measured capacitor and receiving the count value;

examining whether a base count value is set, the base count value corresponding to the capacitance of the measured capacitor when the touch panel is not touched;

when the base count value is set, calculating a difference between the count value and the base count value, for determining whether the touch panel is touched according to the difference;

examining whether the count value is in a predetermined range; and when the count value is out of the predetermined range, performing a charging and discharging capacity setting process for adjusting the charging rate for the variable charging capacity and the discharging rate for the variable discharging capacity.

12. The touch control device of claim 11, wherein the charging and discharging capacity setting process comprises:
receiving the count value;
determining whether the count value is in the predetermined range, for generating a determination result; and
adjusting the charging rate of the variable charging capacity and the discharging rate for the variable discharging capacity according to the determination result.

13. The touch control device of claim 12, wherein the processing unit reduces the charging rate of the variable charging capacity when the determination result indicates that the count value is larger than an upper bound of the predetermined range.

14. The touch control device of claim 12, wherein the processing unit increases the discharging rate of the variable discharging capacity when the determination result indicates that the count value is larger than an upper bound of the predetermined range.

15. The touch control device of claim 12, wherein the processing unit increases the charging rate for of the variable charging capacity when the determination result indicates that the count value is smaller than a lower bound of the predetermined range.

16. The touch control device of claim 12, wherein the processing unit reduces the discharging rate of the variable discharging capacity when the determination result indicates that the count value is smaller than a lower bound of the predetermined range.

17. The touch control device of claim 11, wherein the processing unit resets the base count value according to the received count value after the charging rate for variable charging capacity and the discharging rate for discharging capacity are adjusted.

18. The touch control device of claim 17, wherein the processing unit performs a weighted average operation on the base count value and the received count value to generate a calculation result as a new base count value.

19. The touch control device of claim 11, wherein when the charging rate for the variable charging capacity and the discharging rate for discharging capacity are not determined yet, the processing unit charges and discharges the measured capacitor by using a default charging capacity charging rate and a default discharging capacity discharging rate, performs the charging and discharging capacity setting process, and resets the base count value to be equal to the received count value.

20. The touch control device of claim 11, wherein the capacitance measurement device comprises:

a charging control unit for charging the measured capacitor;

a discharging control unit for discharging the measured capacitor;

a first switch coupled to the measured capacitor and the charging control unit, for controlling a connection between the measured capacitor and the charging control unit according to a first switching signal;

a second switch coupled to the measured capacitor and the discharging control unit, for controlling a connection between the measured capacitor and the discharging control unit according to a second switching signal;

a first analog-to-digital (A/D) converter coupled to the measured capacitor, for converting a voltage signal on the measured capacitor into a first signal; and a duty cycle detecting circuit coupled to the measured capacitor, for converting the voltage signal on the measured capacitor into the count value and outputting the count value to the processing unit.

21. The touch control device of claim 20, wherein the capacitance measurement device further comprises:
a voltage generator coupled to the first A/D converter and the duty cycle detecting circuit, for generating a plurality of reference voltages used by the first A/D converter and the duty cycle detecting circuit; and
a third switch coupled to the measured capacitor and the voltage generator, for controlling a connection between the measured capacitor and the voltage generator according to a third switching signal.

22. The touch control device of claim 21, wherein the voltage generator is further utilized for pre-charging the measured capacitor to a predetermined voltage level before the charging control unit charges the measured capacitor and the discharging unit discharges the measured capacitor.

23. The touch control device of claim 22, wherein the predetermined voltage approximates a reference voltage used by the first A/D converter.

24. The touch control device of claim 20, wherein the first A/D converter is a 1-bit A/D converter and is further coupled to the second switch, and the first signal generated by the first A/D converter is the second switching signal.

25. The touch control device of claim 20, wherein the first A/D converter is a 1-bit A/D converter and is further coupled to the first switch, and the first signal generated by the first A/D converter is the first switching signal.

26. The touch control device of claim 20, wherein the first A/D converter is an N-bit A/D converter and is further coupled to the discharging control unit, and the discharging control unit selects a discharging capacity for discharging the measured capacitor from a plurality of discharging capacities according to the first signal, where N is an integer larger than 1.

27. The touch control device of claim 26, wherein the first switching signal is generated by the processing unit and the second switching signal is generated by the discharging control unit.

28. The touch control device of claim 20, wherein the first A/D converter is an N-bit A/D converter and is further coupled to the charging control unit, and the charging control unit selects a charging capacity for charging the measured capacitor from a plurality of charging capacities according to the first signal, where N is an integer larger than 1.

29. The touch control device of claim 28, wherein the first switching signal is generated by the charging control unit and the second switching signal is generated by the processing unit.

30. The touch control device of claim 20, where the duty cycle detecting circuit comprises:
- a second A/D converter coupled to the measured capacitor, for converting the voltage signal on the measured capacitor into a second signal; and
- a digital signal processing unit coupled to the second A/D converter, for converting the second signal into the count value.

31. The touch control device of claim 30, wherein the second A/D converter is a 1-bit A/D converter.

32. The touch control device of claim 30, wherein the second A/D converter is an N-bit A/D converter, where N is an integer larger than 1.

33. A touch detection method for a touch control device including a touch panel, the touch detection method comprising:
- charging and discharging a measured capacitor by using a variable charging capacity and a variable discharging capacity, and generating a count value according to a voltage of a measured capacitor;
- calculating a difference between the count value and a base count value, for determining whether the touch panel is touched according to the difference; and
- performing a charging and discharging capacity setting process for adjusting a charging rate for the variable charging capacity and a discharging rate for the variable discharging capacity according to the count value.

34. The touch detection method of claim 33, wherein the step of performing the charging and discharging capacity setting process for adjusting the charging rate of the variable charging capacity and the discharging rate of the variable discharging capacity according to the count value comprises:
- examining whether the count value is in a predetermined range; and
- when the count value is out of the predetermined range, performing a charging and discharging capacity setting process for adjusting the charging rate of the variable charging capacity and the discharging rate of the variable discharging capacity.

35. A touch detection method for a touch control device including a touch panel, the touch detection method comprising:
- charging and discharging a measured capacitor by using a variable charging capacity and a variable discharging capacity, and receiving a voltage of the measured capacitor, for determining whether the touch panel is touched according to the voltage of the measured capacitor; and
- performing a charging and discharging capacity setting process for adjusting the charging rate of the variable charging capacity and the discharging rate of the variable discharging capacity according to the voltage of the measured capacitor.

36. A touch control device comprising:
- a touch panel;
- a capacitance measurement device coupled to the touch panel, for charging and discharging a measured capacitor by using a variable charging capacity and a variable discharging capacity, and generating a count value according to a voltage of a measured capacitor; and
- a processing unit coupled to the capacitance measured device, for calculating a difference between the count value and a base count value for determining whether the touch panel is touched according to the difference, and performing a charging and discharging capacity setting process for adjusting a charging rate for the variable charging capacity and a discharging rate for the variable discharging capacity according to the count value.

37. The touch control device of claim 36, wherein the processing unit further examines whether the count value is in a predetermined range, and when the count value is out of the predetermined range, the processing unit performs a charging and discharging capacity setting process for adjusting the charging rate for the charging capacity and the discharging rate for the discharging capacity.

38. A touch control device comprising:
- a touch panel;
- a capacitance measurement device coupled to the touch panel, for charging and discharging a measured capacitor by using a variable charging capacity and a variable discharging capacity, and receiving a voltage of a measured capacitor; and
- a processing unit coupled to the capacitance measured device, for determining whether the touch panel is touched according to the voltage of the measured capacitor, and performing a variable charging and discharging capacity setting process for adjusting the charging rate for the variable charging capacity and the discharging rate for the variable discharging capacity according to the voltage of the measured capacitor.

* * * * *